United States Patent
Reilly et al.

(10) Patent No.: US 11,043,838 B2
(45) Date of Patent: Jun. 22, 2021

(54) SYSTEM AND METHOD TO REDUCE CONVERTER EMISSIONS

(71) Applicant: SCHNEIDER ELECTRIC IT CORPORATION, West Kingston, RI (US)

(72) Inventors: David E. Reilly, Concord, MA (US); Emanuel Landsman, Lexington, MA (US)

(73) Assignee: SCHNEIDER ELECTRIC IT CORPORATION, Foxboro, MA (US)

(*) Notice: Subject to any disclaimer, the term of this patent is extended or adjusted under 35 U.S.C. 154(b) by 83 days.

(21) Appl. No.: 16/205,354

(22) Filed: Nov. 30, 2018

(65) Prior Publication Data

US 2020/0177017 A1    Jun. 4, 2020

(51) Int. Cl.
| | |
|---|---|
| *H02J 9/06* | (2006.01) |
| *H02M 1/12* | (2006.01) |
| *H02M 1/42* | (2007.01) |
| *H02M 7/17* | (2006.01) |
| *H02M 1/00* | (2006.01) |

(52) U.S. Cl.
CPC ............. *H02J 9/061* (2013.01); *H02M 1/126* (2013.01); *H02M 1/4225* (2013.01); *H02M 7/17* (2013.01); *H02M 2001/0064* (2013.01)

(58) Field of Classification Search
CPC ...... H02J 9/061; H02M 1/126; H02M 1/4225; H02M 7/17
USPC .............................................. 307/64, 65, 66
See application file for complete search history.

(56) References Cited

U.S. PATENT DOCUMENTS

| | | | |
|---|---|---|---|
| 8,228,046 B2* | 7/2012 | Ingemi | H02M 3/158 323/222 |
| 8,884,464 B2* | 11/2014 | Jayaraman | H02M 3/1582 307/66 |

(Continued)

FOREIGN PATENT DOCUMENTS

WO    2013151528 A1    10/2013

OTHER PUBLICATIONS

Yoshida, Toshiya et al., "An Improvement Technique for the Efficiency of High-Frequency Switch-Mode Rectifiers," IEEE Transactions on Power Electronics, vol. 15, No. 6, Nov. 2000, pp. 1118-1123.

(Continued)

*Primary Examiner* — Michael R. Fin
(74) *Attorney, Agent, or Firm* — Lando & Anastasi, LLP

(57) ABSTRACT

According to one aspect, embodiments herein provide a UPS comprising a UPS input configured to be coupled to an AC power source and to receive input AC power, an interface configured to be coupled to a DC power source and to receive backup DC power, a UPS output configured to provide output power derived from at least one of the input AC power and the backup DC power to a load, a converter comprising a converter input coupled to the UPS input, a converter output, a first converter path coupled between the converter input and the converter output, and a second converter path coupled between the converter input and the converter output, and a controller configured to operate the first converter path and the second converter path to convert the input AC power into DC power and provide the DC power to the converter output.

19 Claims, 4 Drawing Sheets

(56) References Cited

U.S. PATENT DOCUMENTS

2008/0067872 A1*   3/2008  Moth .................... H02J 9/062
                                                    307/23
2015/0146467 A1    5/2015  Seong et al.
2015/0311816 A1   10/2015  Ohshita et al.
2018/0166913 A1*   6/2018  Patel ............... G01R 19/16547

OTHER PUBLICATIONS

Extended European Search Report from corresponding European Application No. 19208840.9 dated Mar. 27, 2020.
Rene P T Bascope et al: "Interleaved Two-Switch Flyback Converter with Power Factor Correction for UPS Applications", 2018 13th IEEE International Conference on Industry Applications (INDUSCON), IEEE, Nov. 12, 2018 (Nov. 12, 2018), pp. 537-543, XP033513335, DOI: 10.1109/INDUSCON.2018.8627314 [retrieved on Jan. 25, 2019].

* cited by examiner

SYSTEM AND METHOD TO REDUCE CONVERTER EMISSIONS

BACKGROUND

1. Field of Invention

The present invention relates generally to systems and methods for controlling an uninterruptible power supply (UPS) but has application to any boost PFC converter front end.

2. Discussion of Related Art

The use of power devices, such as uninterruptible power supplies (UPS), to provide regulated, uninterrupted power for sensitive and/or critical loads, such as computer systems and other data processing systems, is known. Known uninterruptible power supplies include on-line UPS's, off-line UPS's, line interactive UPS's as well as others. On-line UPS's provide conditioned AC power as well as back-up AC power upon interruption of a primary source of AC power. Off-line UPS's typically do not provide conditioning of input AC power, but do provide back-up AC power upon interruption of the primary AC power source. Line interactive UPS's are similar to off-line UPS's in that they switch to battery power when a blackout occurs but also typically include a multi-tap transformer for regulating the output voltage provided by the UPS.

SUMMARY

At least one aspect of the invention is directed to an Uninterruptible Power Supply (UPS) comprising a UPS input configured to be coupled to an AC power source and to receive input AC power, an interface configured to be coupled to a DC power source and to receive backup DC power, a UPS output configured to provide output power derived from at least one of the input AC power and the backup DC power to a load, a converter comprising a converter input coupled to the UPS input, a converter output, a first converter path coupled between the converter input and the converter output, and a second converter path coupled between the converter input and the converter output, and a controller configured to operate the first converter path and the second converter path to convert the input AC power into DC power and provide the DC power to the converter output.

According to one embodiment, the UPS further comprises a DC bus coupled to the converter output and configured to receive the DC power from the converter and the backup DC power from the DC power source, and an inverter coupled between the DC bus and the UPS output, wherein the controller is further configured to operate the inverter to provide the output power derived from at least one of the DC power from the converter and the backup DC power to the UPS output. In one embodiment, in operating the first converter path and the second converter path, to convert the input AC power into DC power and provide the DC power to the converter output, the controller is further configured to operate the first converter path to provide a first portion of the DC power to the converter output, and to operate the second converter path to provide a second portion of the DC power to the converter output.

According to another embodiment, the UPS further comprises a filter coupled to the converter input, wherein the first converter path comprises a first inductor coupled to the filter, and a first switch coupled to the first inductor and to ground, wherein in operating the first converter path to provide the first portion of the DC power to the converter output, the controller is further configured to operate the first switch at a first frequency to generate a first current signal in the first converter path having the first frequency. In one embodiment, the second converter path comprises a second inductor coupled to the filter, and a second switch coupled to the second inductor and to ground, wherein in operating the second converter path to provide the second portion of the DC power to the converter output, the controller is further configured to operate the second switch at a second frequency to generate a second current signal in the second converter path having the second frequency.

According to one embodiment, the second frequency is a multiple of the first frequency. In one embodiment, in operating the second switch at the second frequency, the controller is further configured to operate the second switch to modulate the second current signal to reduce current signals at the UPS input having frequencies related to the first frequency. In another embodiment, in operating the second switch to modulate the second current signal, the controller is further configured to operate the second switch to amplitude modulate the second current signal to have a short-term average with a modulation frequency equal to the first frequency. In one embodiment, in operating the second switch to modulate the second current signal, the controller is further configured to operate the second switch to amplitude modulate the second current signal to have the short-term average be 180° out of phase with the first current signal. In another embodiment, in operating the second switch to modulate the second current signal, the controller is further configured to operate the second switch to amplitude modulate the second current signal to have an average value configured to reduce the first current signal when the second current signal is summed with the first current signal. In one embodiment, the first inductor has an inductance multiple times greater than an inductance of the second inductor.

Another aspect of the invention is directed to a method for operating a UPS comprising an input configured to be coupled to an AC power source and to receive input AC power from the AC power source, an interface configured to be coupled to a DC power source and to receive backup DC power from the DC power source, a converter coupled to the input, and an output configured to provide output power derived from at least one of the input AC power and the backup DC power to a load, the method comprising receiving the input AC power at the input from the AC power source, converting, with a first converter path of the converter, the input AC power into a first portion of DC power provided to an output of the converter, converting, with a second converter path in parallel with the first converter path, the input AC power into a second portion of the DC power provided to the output of the converter, generating a first current signal in the first converter path having a first frequency, and generating a second current signal in the second converter path having a second frequency.

According to one embodiment, the method further comprises providing the DC power at the output of the converter to an inverter, converting, with the inverter, at least one of the DC power from the converter and the backup DC power into output AC power, and providing the output AC power to the output of the UPS. In one embodiment, the method further comprises summing the first current signal and the second current signal to reduce current signals at the input having frequencies related to the first frequency. In another embodiment, generating the second current signal in the second converter path comprises generating the second current ripple with the second frequency that is a multiple of the first frequency. In one embodiment, generating the second current signal comprises amplitude modulating the second current signal to have a short-term average with a modulation frequency equal to the first frequency. In another embodiment, amplitude modulating the second current signal includes amplitude modulating the second current signal so that the short-term average is 180° out of phase with the first current signal. In one embodiment, amplitude modulating the second current signal includes amplitude modulating the second current signal to have an average value that reduces the first current signal when the second current signal is summed with the first current signal. In another embodiment, the method further comprises filtering the input AC power.

At least one aspect of the invention is directed to an Uninterruptible Power Supply (UPS) comprising a UPS input configured to be coupled to an AC power source and to receive input AC power, an interface configured to be coupled to a DC power source and to receive backup DC power, a UPS output configured to provide output power to a load, and means for generating the output power derived from at least one of the input AC power and the backup DC power, for converting the input AC power into DC power via parallel converter paths, for providing a majority of the DC power to the UPS output with a first one of the parallel converter paths, and for reducing current signals at the UPS input with a second one of the parallel converter paths.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
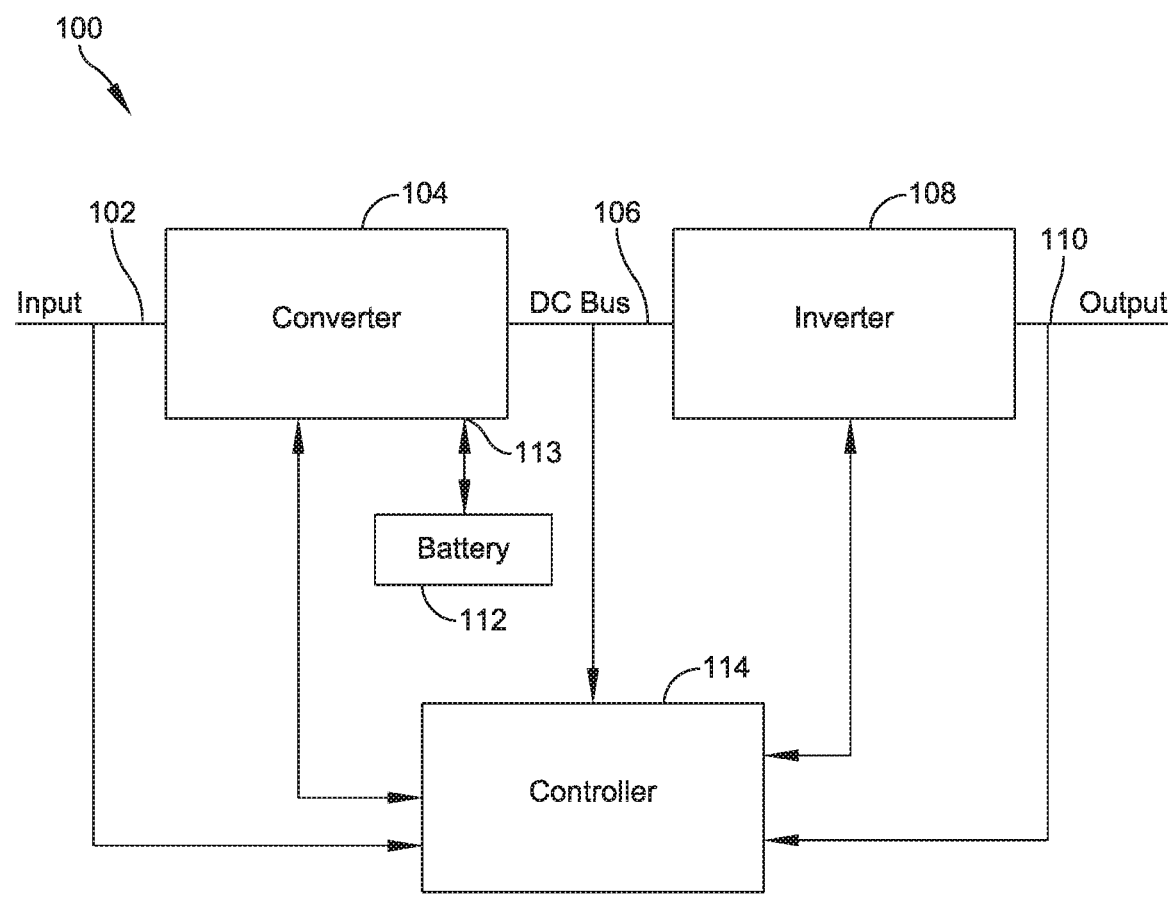
FIG. 1 is a block diagram of an online UPS according to aspects described herein.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, power devices, such as uninterruptible power supplies (UPS) are oftentimes used to provide regulated, uninterrupted power to sensitive and/or critical loads. A conventional online UPS rectifies input AC power provided by an electric utility using a Power Factor Correction circuit (PFC) to provide DC power to a DC bus. The rectified DC power on the DC Bus is typically used to charge and maintain a battery while mains power is available. In the absence of mains power, the battery discharges and provides DC power to the DC bus. From the DC power on the DC bus, an inverter generates an AC output voltage that is provided to a load. Since the DC bus is powered either by mains or the battery, the output power of the UPS is uninterrupted if the mains fails and the battery is sufficiently charged. Typical online UPS's may also operate in a bypass mode where unconditioned power with basic protection is provided directly from an AC power source to a load via a bypass line.

Traditional online UPS systems commonly utilize a "boost converter" as a front-end PFC circuit to convert input AC power from an AC source into DC power. Such "boost converters" are typically operated at a switching frequency below about 30 kHz for reasons of efficiency and to keep the major harmonics of the switching frequency below 150 kHz (above which certain regulatory emissions limits go into effect). In some applications, it may presently be required to limit conducted emissions at frequencies below 150 kHz, for example, down to 10 kHz as for marine applications. Future emissions limits may be extended down to 10 kHz for other applications.

One common approach for reducing lower frequency range emissions of a converter is to include an additional filter in the converter or externally. However, such filters are typically large and expensive. In at least one embodiment described below, a front-end converter is provided that reduces lower frequency emissions without utilizing a physically bulky and expensive filter.

FIG. 1 is a block diagram of an online UPS 100 according to one aspect of the present invention. The UPS 100 includes an input 102, a converter 104, a DC bus 106, an inverter 108, an output 110, a battery 112, and a controller 114. The input 102 is coupled to the converter 104. The DC bus 106 is coupled between the converter 104 and the inverter 108. The output 110 is coupled to the inverter 108. The controller 114 is coupled to the input 102, the output 110, the converter 104, the DC bus 106, and the inverter 108. The battery is coupled to the converter 104 via an interface 113.

The input 102 is configured to be coupled to an AC mains power source and to receive input AC power having an input voltage level. The controller 114 monitors the input AC power received by the input 102 and is configured to operate the UPS 100 in different modes of operation based on the status of the input AC power received by the input 102. When AC power provided to the input 102 is acceptable (i.e., above an input voltage threshold), the controller 114 operates the UPS 100 in a normal mode of operation. In the normal mode of operation, AC power from the input 102 is provided to the converter 104. According to one embodiment, the converter 104 is a Power Factor Correction converter 104; however, in other embodiments, other types of converters may be utilized.

The controller 114 operates the converter 104 to convert the AC power into DC power and provide the DC power to the DC bus 106. In one embodiment, DC power is also provided from the converter 104 to the battery 112 to charge the battery 112. In another embodiment, DC power from the DC bus 106 is provided to the battery 112 via a DC/DC converter to charge the battery 112. In the normal mode of operation, the inverter 108 receives DC power from the DC bus 106, and the controller 114 operates the inverter 108 to convert the DC power into regulated AC power and provide regulated AC power to a load coupled to the output 110.

When AC voltage provided to the input 102 is not acceptable (i.e., below an input voltage threshold), the controller 114 operates the UPS 100 in a backup mode of operation. In the backup mode of operation, DC power from the battery 112 is regulated (e.g., by the converter 104 or a DC/DC converter coupled to the battery 112) and provided to the DC bus 106. The inverter 108 receives the DC power from the DC bus 106, and the controller 114 operates the inverter 108 to convert the DC power into regulated AC power and provide the regulated AC power to the output 110.

Figure 2A:
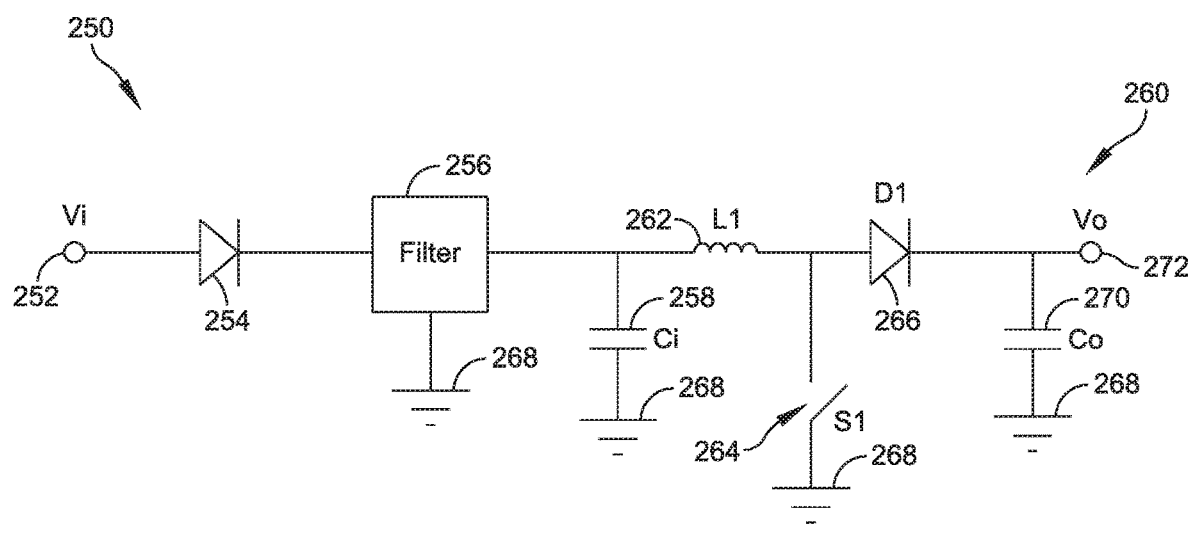
FIG. 2A is a schematic diagram of a conventional converter.

As discussed above, traditional online UPS systems can utilize a "boost converter" as a front-end PFC circuit to convert input AC power from an AC source into DC power. For example, FIG. 2A is a schematic diagram of a conventional converter 250 which can be utilized as a front-end PFC circuit of a UPS. The converter 250 includes an input (Vi) 252, an input diode 254, a filter 256, a capacitor (Ci) 258, a single converter path 260, an output capacitor 270, and an output 272. The single converter path 260 includes an inductor (L1) 262, a switch (S1) 264, and a diode (D1) 266. In operation, the input (Vi) 252 of the conventional converter 260 receives input AC power from an AC power source. A controller operates the single converter path 260 to convert the input AC power to output DC power provided to the output 272.

During operation of the conventional converter, a low frequency current waveform (e.g., a low frequency triangle current waveform) is typically generated in the inductor (L1) 262. As discussed above, a common approach for reducing such a low frequency waveform of the converter path 260 is to include an additional filter in the converter 250. However, such filters are typically large and expensive.

Figure 2B:
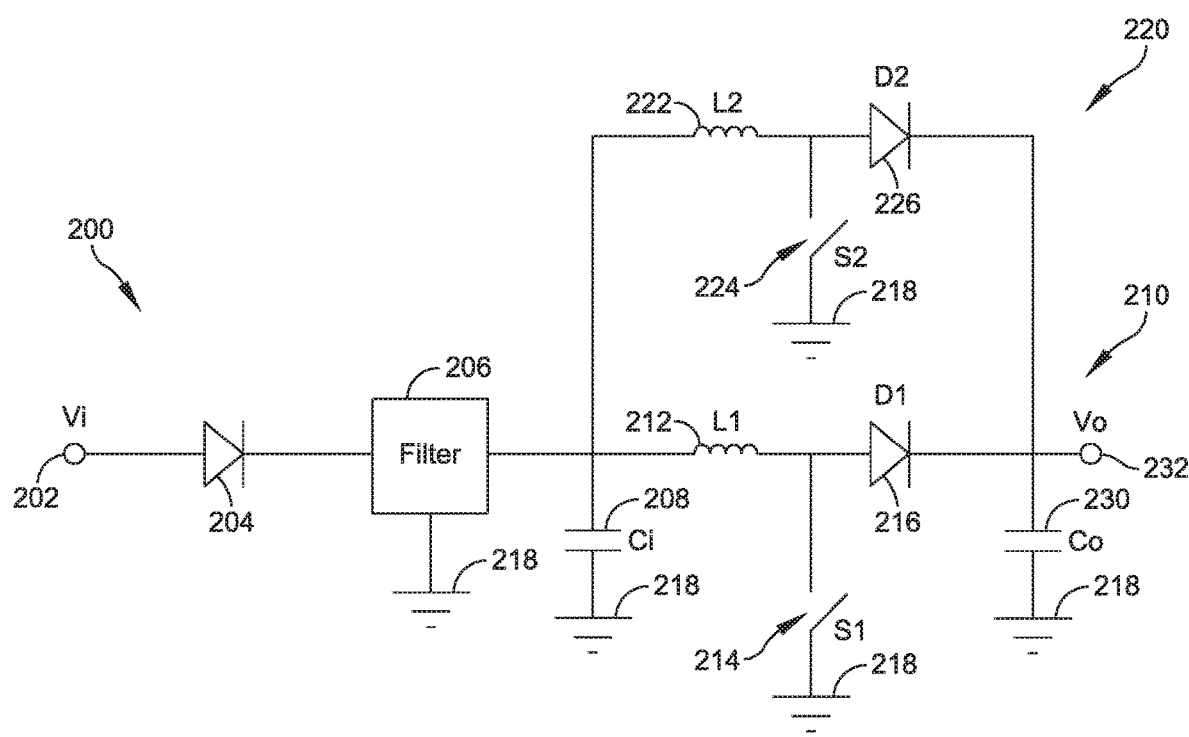
FIG. 2B is a schematic diagram of a converter according to aspects described herein.

As described herein, a front-end converter is provided that reduces lower frequency emissions without utilizing a physically bulky and expensive filter. FIG. 2B is a circuit diagram of one embodiment of a front-end PFC converter 200 which can be utilized as the converter 104 shown in FIG. 1. The converter 200 includes an input (Vi) 202, an input diode 204, a filter 206 (e.g., a low pass filter), a capacitor (Ci) 208, a first converter path 210, a second converter path 220, an output capacitor 230, and an output 232. The first converter path 210 includes a first inductor (L1) 212, a first switch (S1) 214, and a first diode (D1) 216. The second converter path 220 includes a second inductor (L2) 222, a second switch (S2) 224, and a second diode (D2) 226. According to one embodiment, the first and second switches (S1, S2) 214, 214 are Metal-Oxide-Semiconductor Field-Effect Transistors (MOSFET); however, in other embodiments, different types of switches or transistors can be utilized. The controller 114 is coupled to each switch 214, 224, for example, to the gate of each switch 214, 224 where the switches are transistors.

The input (Vi) 202 is configured to be coupled to an input AC power source (e.g., AC Mains) via the input 102 of the UPS. The anode of the input diode 204 is coupled to the input (Vi) 202 and the cathode of the input diode 204 is coupled to an input of the filter 206. An output of the filter 206 is coupled to both the first converter path 210 and the second converter path 220. The filter 206 is also coupled to ground 218. A first terminal of the capacitor (Ci) 208 is coupled to both the first converter path 210 and the second converter path 220. A second terminal of the capacitor (Ci) 208 is coupled to ground 218.

A first end of the first inductor (L1) 212 is coupled to the output of the filter 206 and a second end of the first inductor (L1) 212 is coupled to the anode of the first diode (D1) 216. The cathode of the first diode (D1) 216 is coupled to the output 232. A first terminal of the first switch (S1) 214 is coupled to the anode of the first diode (D1) 216 and a second terminal of the first switch (S1) 214 is coupled to ground 218. A first terminal of the output capacitor (Co) 230 is coupled to the output 232 and a second terminal of the output capacitor (Co) 230 is coupled to ground 218. A first end of the second inductor (L2) 222 is coupled to the output of the filter 206 and a second end of the second inductor (L2) 222 is coupled to the anode of the second diode (D2) 226. The cathode of the second diode (D2) 226 is coupled to the output 232. A first terminal of the second switch (S2) 224 is coupled to the anode of the second diode (D2) 226 and a second terminal of the second switch (S2) 224 is coupled to ground 218. The output 232 is configured to be coupled to a load (e.g., the DC bus 106 shown in FIG. 1 or another type of load such as an external load).

Figure 3:
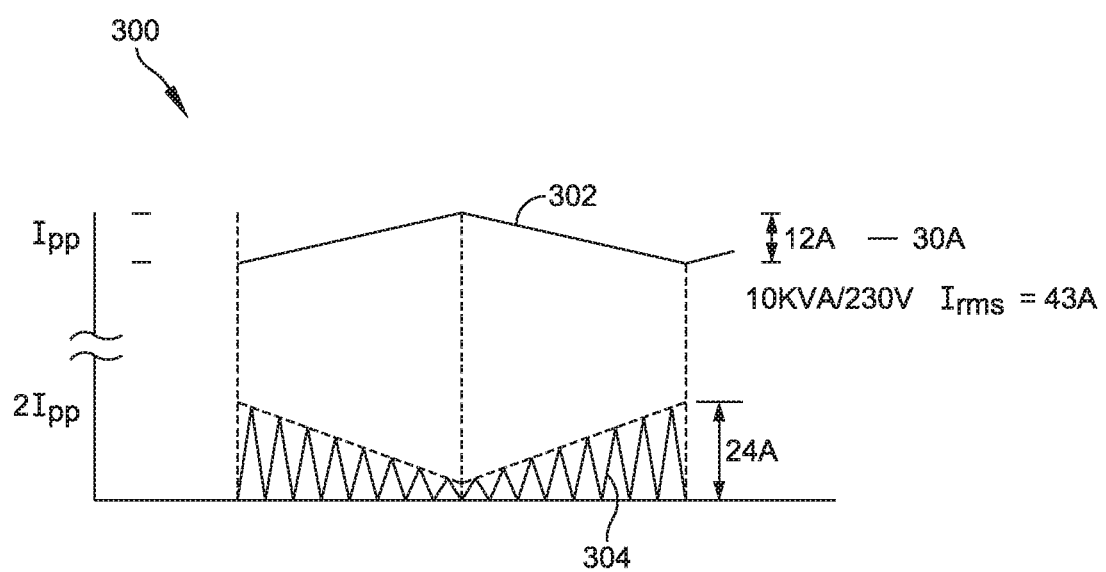
FIG. 3 is a graph illustrating operation of a converter according to aspects described herein.

Operation of the converter 200 is discussed below with respect to FIGS. 2-3. FIG. 3 includes a graph 200 representing operation of the converter 200. The graph 300 includes a first trace 302 representing a current signal through the first inductor (L1) 212 of the first converter path 210 and a second trace 304 representing a current signal through the second inductor (L2) 222.

In the normal mode of operation of the UPS 100, the input (Vi) 202 of the converter 200 receives input AC power from the AC power source (e.g., AC power having an AC voltage level of 230 VAC). The controller 114 operates the first converter path 210 and the second converter path 220 to convert the input AC power to output DC power provided to the output 232 (e.g., DC power having a DC voltage level of 400 VDC). A majority of the DC power provided to the output 232 by the converter 200 is provided via the first converter path 210. More specifically, the controller operates the first switch 214 so that the first converter path 210 provides a first portion of the output DC power (derived from the input AC power) to the output 232 and operates the second switch 224 so that the second converter path 220 provides a second portion of the output DC power (derived from the input AC power) to the output 232, where the first portion of DC power provided by the first converter path 210 is larger than the second portion 220 provided by the second converter path.

For example, as shown in FIG. 3, with the input AC power received at the input 202 having an AC current level of 30A, the first switch 214 is operated by the controller 114 to generate a current signal 302 through the first inductor (L1) 212 having a peak-to-peak amplitude of 12A and a low frequency of, for example, 20 kHz. The second switch 224 is operated by the controller 114 to generate a current signal 304 through the second inductor (L2) 222 having a peak-to-peak amplitude of 24A and a high frequency of, for example, 200 kHz. As also shown in FIG. 3, the controller 114 operates the second switch 224 to modulate the amplitude of the high frequency current signal 304 through the second converter path 220 so that the short-term average of the current signal 304 has a modulation frequency that is the same as the frequency of the current signal 302 through the first converter path 210. The controller 114 also operates the second switch 224 to modulate the high frequency current signal 304 so that the short-term average of the current signal 304 is 180° out of phase with the low frequency current signal 302 and so that the "average value" of the amplitude of the current signal 304 operates to reduce (or cancel) the current signal 302 when the first current signal 302 and the second current signal 304 are summed. In reducing the current signal 302, current signals at the input 202 having frequencies related to the low frequency of the current signal 302 (e.g., harmonics) can also be reduced or canceled.

As the current signal 304 through the second converter path 220 is operated to have a frequency about ten times greater than that of the current signal 302 through the first converter path 210 and the majority of DC power provided to the output 232 is provided via the first converter path 210, the second converter path 220 can be configured to reduce the current signal 302 in the first converter path 210 (and current signals at the input 202 having frequencies related to the low frequency of the current signal 302) by utilizing relatively small components. For example, in one embodiment, the size of the second inductor (L2) 222 (e.g., 40 µH) can be about ten times smaller than that of the first inductor (L1) 212 (e.g., 400 µH). In other embodiments, the size of each inductor 212, 222 can be configured at any appropriate level. In at least one embodiment, the second switch (S2) 224 includes a Silicon Carbide or Gallium Nitride based semiconductor; however, in other embodiments, any appropriate switch/transistor can be utilized as second switch (S2) 224. Designing the second converter path 220 to process bidirectional power results in minimum peak currents but does not contribute to net output power.

As discussed above, the controller 114 is configured to monitor and control operation of the UPS 100. Using data stored in associated memory, the controller 114 is operable to execute one or more instructions that may result in the manipulation of one or more switches' conductive states. In some examples, the controller 114 can include one or more processors or other types of controllers. The controller 114 may perform a portion of the functions discussed herein on a processor, and perform another portion using an Application-Specific Integrated Circuit (ASIC) tailored to perform particular operations. Examples in accordance with the present invention may perform the operations described herein using many specific combinations of hardware and software and the invention is not limited to any particular combination of hardware and software components.

As described herein, an improved front-end converter for an online UPS is described; however, such a converter can also be utilized in other types of Uninterruptible Power Supplies and/or in other types of power systems in which AC to DC conversion is performed (e.g., with a variable speed motor driver).

As also described above, the low-level frequency of the first converter path current signal is about 20 kHz and the high-level frequency of the second converter path current signal is about 200 kHz; however, in other embodiments, the frequency of the current signal through each converter path can be set at any appropriate level. In addition, the value of each component in the converter 200 can be set at any appropriate level.

As discussed above, a front-end converter is provided that reduces low frequency emissions without utilizing a physically bulky and expensive filter. In at least one embodiment, the front-end converter can also provide Power Factor Correction (PFC).

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An Uninterruptible Power Supply (UPS) comprising:
   a UPS input configured to be coupled to an AC power source and to receive input AC power;
   an interface configured to be coupled to a DC power source and to receive backup DC power;
   a UPS output configured to provide output power derived from at least one of the input AC power and the backup DC power to a load;
   a converter comprising:
      a converter input coupled to the UPS input;
      a converter output;
      a first converter path coupled to the converter input and the converter output, the first converter path being configured to generate a first current signal having a first frequency;
      a second converter path coupled to the converter input and the converter output in parallel with the first converter path, the second converter path being configured to generate a second current signal having a second frequency; and
      a controller configured to operate the first converter path and the second converter path to convert the input AC power into DC power and provide the DC power to the converter output,
      wherein the first converter path is configured to provide a first portion of the DC power derived from the input AC power and the second converter path is configured to provide a second portion of the DC power derived from the input AC power.

2. The UPS of claim 1, further comprising:
   a DC bus coupled to the converter output and configured to receive the DC power from the converter and the backup DC power from the DC power source; and
   an inverter coupled between the DC bus and the UPS output,
   wherein the controller is further configured to operate the inverter to provide the output power derived from at least one of the DC power from the converter and the backup DC power to the UPS output.

3. The UPS of claim 1, further comprising a filter coupled to the converter input, wherein the first converter path comprises:
 a first inductor coupled to the filter; and
 a first switch coupled to the first inductor and to ground,
 wherein in operating the first converter path to provide the first portion of the DC power to the converter output, the controller is further configured to operate the first switch at the first frequency to generate the first current signal in the first converter path having the first frequency.

4. The UPS of claim 3, wherein the second converter path comprises:
 a second inductor coupled to the filter; and
 a second switch coupled to the second inductor and to ground,
 wherein in operating the second converter path to provide the second portion of the DC power to the converter output, the controller is further configured to operate the second switch at the second frequency to generate the second current signal in the second converter path having the second frequency.

5. The UPS of claim 4, wherein the second frequency is a multiple of the first frequency.

6. The UPS of claim 4, wherein in operating the second switch at the second frequency, the controller is further configured to operate the second switch to modulate the second current signal to reduce current signals at the UPS input having frequencies related to the first frequency.

7. The UPS of claim 6, wherein in operating the second switch to modulate the second current signal, the controller is further configured to operate the second switch to amplitude modulate the second current signal to have a short-term average with a modulation frequency equal to the first frequency.

8. The UPS of claim 7, wherein in operating the second switch to modulate the second current signal, the controller is further configured to operate the second switch to amplitude modulate the second current signal to have the short-term average be 180° out of phase with the first current signal.

9. The UPS of claim 7, wherein in operating the second switch to modulate the second current signal, the controller is further configured to operate the second switch to amplitude modulate the second current signal to have an average value configured to reduce the first current signal when the second current signal is summed with the first current signal.

10. The UPS of claim 6, wherein the first inductor has an inductance multiple times greater than an inductance of the second inductor.

11. A method for operating a UPS comprising an input configured to be coupled to an AC power source and to receive input AC power from the AC power source, an interface configured to be coupled to a DC power source and to receive backup DC power from the DC power source, a converter coupled to the input, and an output configured to provide output power derived from at least one of the input AC power and the backup DC power to a load, the method comprising:
 receiving the input AC power at the input from the AC power source;
 converting, with a first converter path of the converter coupled to an input of the converter and an output of the converter, the input AC power into a first portion of DC power provided to an output of the converter;
 converting, with a second converter path coupled to the input of the converter and the output of the converter in parallel with the first converter path, the input AC power into a second portion of the DC power provided to the output of the converter;
 generating a first current signal in the first converter path having a first frequency; and
 generating a second current signal in the second converter path having a second frequency.

12. The method of claim 11, further comprising:
 providing the DC power at the output of the converter to an inverter;
 converting, with the inverter, at least one of the DC power from the converter and the backup DC power into output AC power; and
 providing the output AC power to the output of the UPS.

13. The method of claim 11, further comprising summing the first current signal and the second current signal to reduce current signals at the input having frequencies related to the first frequency.

14. The method of claim 13, wherein the second frequency is a multiple of the first frequency.

15. The method of claim 14, wherein generating the second current signal comprises amplitude modulating the second current signal to have a short-term average with a modulation frequency equal to the first frequency.

16. The method of claim 15, wherein amplitude modulating the second current signal includes amplitude modulating the second current signal so that the short-term average is 180° out of phase with the first current signal.

17. The method of claim 15, wherein amplitude modulating the second current signal includes amplitude modulating the second current signal to have an average value that reduces the first current signal when the second current signal is summed with the first current signal.

18. The method of claim 11, further comprising filtering the input AC power.

19. An Uninterruptible Power Supply (UPS) comprising:
 a UPS input configured to be coupled to an AC power source and to receive input AC power;
 an interface configured to be coupled to a DC power source and to receive backup DC power;
 a UPS output configured to provide output power to a load; and
 means for generating the output power derived from at least one of the input AC power and the backup DC power by converting the input AC power and/or the backup DC power into DC power via parallel converter paths coupled to a converter input and a converter output,
 wherein a first portion of the DC power derived from the input AC power including a first current signal having a first frequency is provided to the UPS output via a first one of the parallel converter paths and a second portion of the DC power derived from the input AC power including a second current signal having a second frequency is provided to the UPS output via a second one of the parallel converter paths to reduce current signals at the UPS input.

* * * * *